(12) United States Patent
Panikkar et al.

(10) Patent No.: US 7,500,131 B2
(45) Date of Patent: Mar. 3, 2009

(54) TRAINING PATTERN BASED DE-SKEW MECHANISM AND FRAME ALIGNMENT

(75) Inventors: Adarsh Panikkar, Tacoma, WA (US); S. Reji Kumar, University Place, WA (US); Daniel Klowden, Seattle, WA (US); Abhimanyu Kolla, Tacoma, WA (US)

(73) Assignee: Intel Corporation, Santa Clara, CA (US)

( * ) Notice: Subject to any disclaimer, the term of this patent is extended or adjusted under 35 U.S.C. 154(b) by 542 days.

(21) Appl. No.: 10/935,902

(22) Filed: Sep. 7, 2004

(65) Prior Publication Data

US 2006/0053328 A1   Mar. 9, 2006

(51) Int. Cl.
*G06F 1/24* (2006.01)

(52) U.S. Cl. ............... 713/503; 713/500; 713/501; 713/502; 370/503

(58) Field of Classification Search ........... 713/500, 713/501, 502, 503; 370/503; 359/124
See application file for complete search history.

(56) References Cited

U.S. PATENT DOCUMENTS

| | | | | |
|---|---|---|---|---|
| 4,314,355 A | * | 2/1982 | Leighou et al. | 710/61 |
| 5,838,950 A | * | 11/1998 | Young et al. | 703/21 |
| 6,031,847 A | * | 2/2000 | Collins et al. | 370/508 |
| 6,959,015 B1 | * | 10/2005 | Hwang et al. | 370/516 |
| 7,054,331 B1 | * | 5/2006 | Susnow et al. | 370/465 |
| 7,287,176 B2 | * | 10/2007 | Kim et al. | 713/500 |
| 2002/0131105 A1 | * | 9/2002 | Herrity | 359/124 |
| 2003/0074609 A1 | * | 4/2003 | Koyanagi et al. | 714/700 |
| 2003/0214975 A1 | * | 11/2003 | Woelk et al. | 370/503 |
| 2003/0219040 A1 | * | 11/2003 | Kim et al. | 370/503 |
| 2005/0024926 A1 | * | 2/2005 | Mitchell et al. | 365/154 |
| 2005/0141661 A1 | * | 6/2005 | Renaud et al. | 375/372 |
| 2005/0286565 A1 | * | 12/2005 | Vakil et al. | 370/503 |
| 2006/0041696 A1 | * | 2/2006 | Cherukuri et al. | 710/100 |

* cited by examiner

*Primary Examiner*—Thomas Lee
*Assistant Examiner*—Vincent T Tran
(74) *Attorney, Agent, or Firm*—Marger Johnson & McCollom, PC

(57) ABSTRACT

Some embodiments of the invention provide a training sequence that may be used in a deskewing process or a protocol to be implemented in a training sequence deskew. Embodiments may also comprise a training pattern that allows for header or frame alignment.

24 Claims, 4 Drawing Sheets

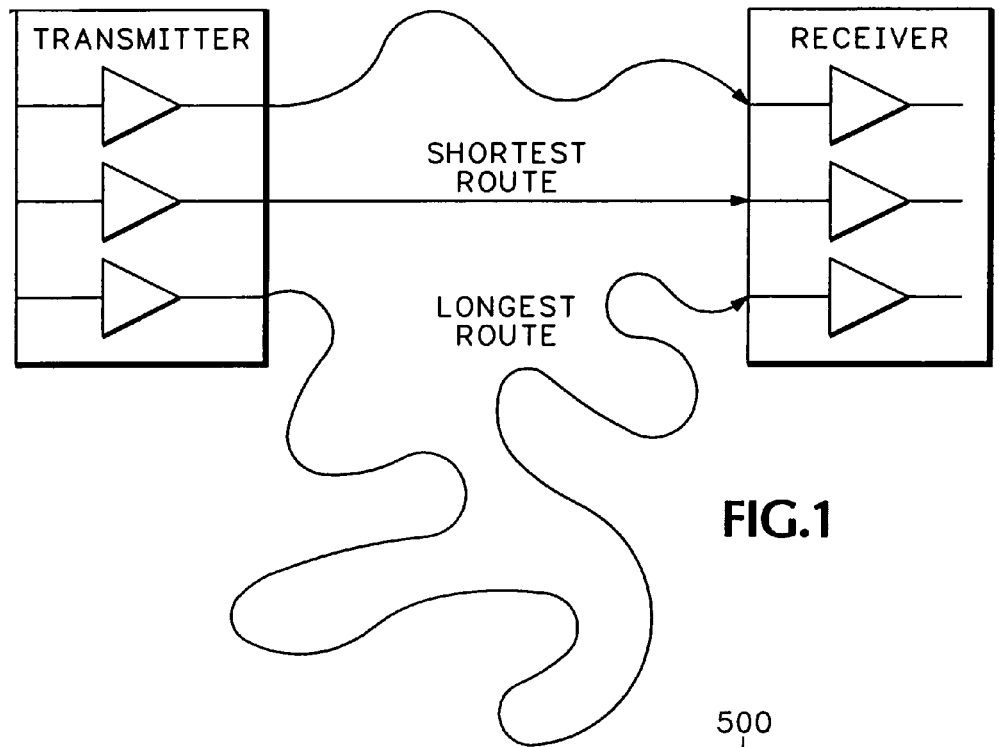
FIG.1
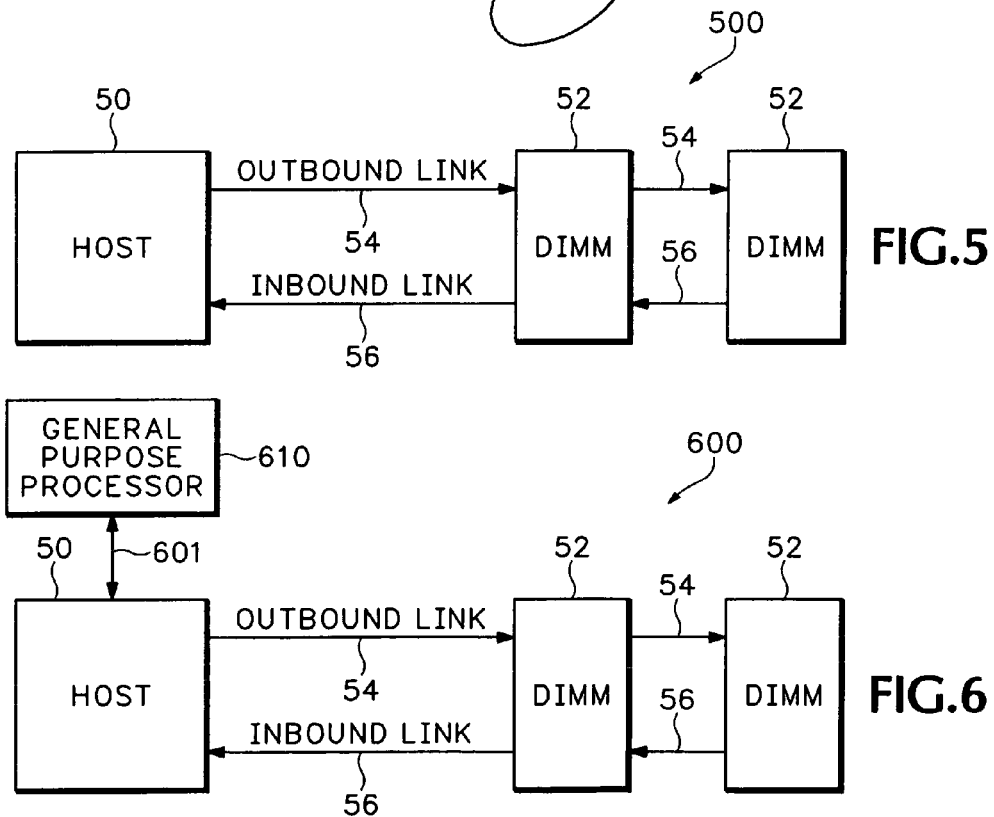
FIG.5
FIG.6

TRAINING PATTERN BASED DE-SKEW MECHANISM AND FRAME ALIGNMENT

BACKGROUND

As electronic devices increase in complexity, data transfer and processing within these devices require greater coordination. One method to coordinate the data transfer and processing in these devices is clocking. Clocking involves periodic signals that synchronize operations in a device.

A potential problem in clocked systems is skew. Skew refers to two or more signals that lose time reference with respect to each other, therefore frustrating synchronization. Skew may be introduced at transmission time or more likely because of mismatches of interconnect/trace length between transmitting and receiving agents. FIG. 1 illustrates different trace lengths that would likely result in skew.

One solution for skew is lane to lane trace-matching. As I/O transfer speeds continue to increase, trace mismatches between various lanes result in an increasing number of bit cells worth of skew and misalignment. Therefore, trace-matching of interconnects for multiple lanes is tedious, particularly given routing congestions and obstructions that may be present. Sometimes trace-matching is not feasible.

Deskewing provides another approach to counter skewing. Communication systems employing multiple channels or lanes carrying data with forwarded/embedded clock information must have some means of deskewing the received information before further data processing can be done. Deskewing generally involves the receiving end negating skew between involved communication lanes. Deskewing therefore allows data streams to regain timing and phase relationships with respect to each other.

Lane-to-lane skew has conventionally been cancelled at the core/link-layer. However, the technique introduces a high latency penalty, since the link-layer for a typical serial I/O interface runs slower than the I/O interface, typically by a factor of 10x~20x, and employs area intensive elastic buffers.

BRIEF DESCRIPTION OF THE DRAWINGS

FIG. 1 illustrates different trace lengths that would likely result in skew.

FIG. 5 illustrates a memory system that may perform a deskew operation based on a training pattern.

FIG. 6 illustrates a memory system including a general purpose processor that may utilize a training pattern to perform a deskew operation.

DETAILED DESCRIPTION

This discussion uses several examples and embodiments for ease of understanding of the embodiments of the invention. No limitations of the scope of the invention to these embodiments or examples is intended nor should it be implied.

In general a training pattern for example in combination with a protocol, may be used to deskew and/or frame align multiple lanes across a communication link. Example design requirements for the training pattern, also called a training sequence, are disclosed below, such as the minimum length criteria for the pattern. Inventive principles may be practiced between 2 or more interfaces with multiple lanes that need to be synchronized. For example, inventive principles may include fiber optic or wireless links, or any other links satisfying the above conditions.

An embodiment may comprise a system with a transmitting agent communicating with at least one receiving agent. The agents may communicate by a interconnect medium having various lanes/channels to carry information. Thus, in the present embodiment, the process depends on a unique pattern that is generated synchronously across all transmitters. Deskewing may be required if the lanes have different propagation delays and/or phases for transmission of data, thus resulting in a possible lane-to-lane skew at the receiving agent.

The present embodiment may include a provision in a signaling/link-layer protocol to provide a training sequence that continuously repeats itself until associated training functions are completed. Additionally, it may include a unique header pattern that may be embedded in the training sequence to be detected on receiver lanes.

Embodiments may also include and benefit from a known amount of maximum skew between lanes based on physical characteristics of communication link, design constraints for training sequence length, and a protocol to initiate the deskew process.

In an embodiment, the proposed training pattern does not have to be dedicated to the deskew operation. The training pattern may have a unique header to enable deskew and may contain bits that perform miscellaneous other functions necessary in communication link training. In an embodiment the header width is substantially equal to one core frame. In an embodiment, the deskew evaluation process compares signals between all the lanes, but inventive principles may also apply to any subset of lanes. Based on the time/cycle difference between receivers on detecting this pattern, the lanes may be deskewed, for example by delaying the fast lanes to match the slow lanes. In an embodiment, deskew begins and ends with the endpoint of the header, this allows an additional benefit of understanding frame positioning, which in turn allows frame alignment with the inventive principles disclosed herein.

Figure 2:
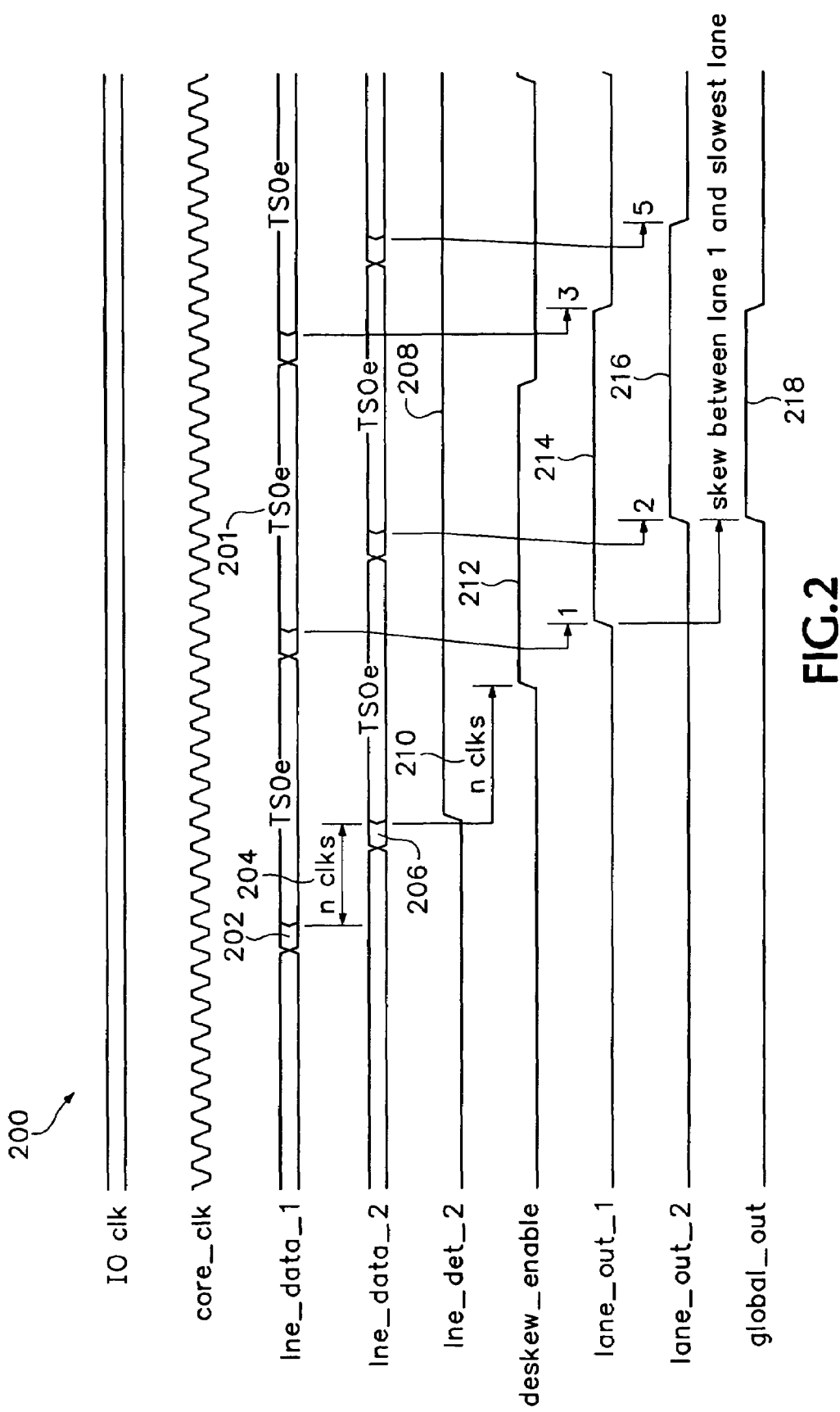
FIG. 2 illustrates a timing diagram illustrating aspects of an embodiment of the invention.
Figure 3:
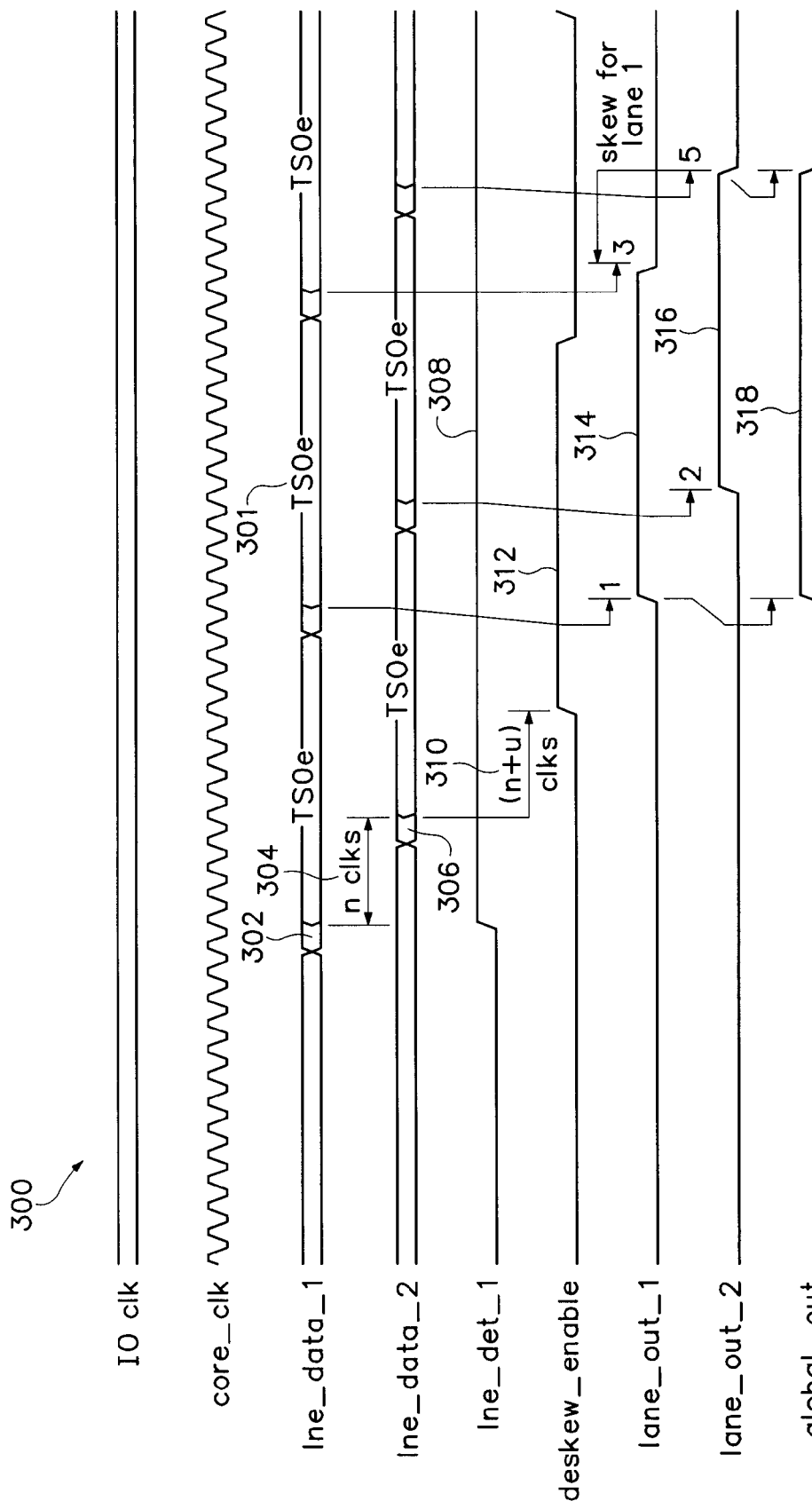
FIG. 3 illustrates a timing diagram illustrating aspects of an embodiment of the invention.

FIG. 2 and FIG. 3 depict two different embodiments of a protocol following inventive principles. The different scenarios are caused by the uncertainty of training event occurrence. For illustrative purposes, assume variable x indicates the worst skew possible for a given architecture. Therefore, if f is the frequency of an IO clock, the number of clock cycles that correspond to the above skew is $n=\lceil x/f \rceil$. This relation will help illustrate an embodiment deskew protocol.

Referring to FIG. 2 and FIG. 3, an embodiment may comprise a deskew protocol that operates as described below.

Upon detection of a header, 202 in FIG. 2 and 302 in FIG. 3, a respective remote agent notifies a controller, for example, a IO may notify a core using a lane_det_* status signal 208.

In the embodiment in FIG. 2, the core waits until lane_det_* signals 208 from all the IOs assert. Upon arrival of the last lane_det_* 208 assertion, the core waits for greater than or equal to n cycles and then asserts a deskew_enable signal 212, which will be seen synchronously by all IOs. Upon reception of deskew_enable signal 212, all lanes wait for the next local detection of the header 202. Upon detection, each lane asserts its local status signal, lane_out_* 214, which can be used to evaluate the spread between lanes.

The necessity for the core waiting n cycles before asserting deskew_enable 212, 312 in FIG. 3, becomes apparent by referring to FIG. 3. Recall, the training sequence 301 is a continuously repeating pattern. In the event one of the faster lanes asserts lane_det_* 308 last, the core needs to wait for all the slow arriving headers, for example 306, to pass before asserting deskew_enable 312 to prevent a slow arriving header 306 from asserting lane_out 316 earlier than the fast lane asserting lane_out 314. By virtue of a minimum length of the deskew pattern, a delay n 304 precludes any slow arriving lane from asserting it's lane_out 316 signal until an ordered set of headers, starting with the header of the fastest lane, in this example header 302, is seen across all lanes.

FIG. 2 depicts a case where the slowest lane asserts its $lane\_det_{13}$ * 208 signal last. The training sequence 201 length requirement derived below will ensure that all the fast lane headers 202 appear on the respective lanes only after the assertion of the deskew_enable 212 signal.

In the present embodiment, a global signal, global_out 218 or 318, is comprised of all the lane_det_* signals. The global_out signal 218 is represented as an AND of all lane_det_* signals, while the global_out signal 318 is represented as an OR of all lane_det_* signals. In general, any logic may be used so long as it allows a substantially uniform signal across multiple lanes that in turn allows deskewing.

In this embodiment, the global_out signal, 218, asserts when the slowest lane_out_* 216 transitions. The difference between the local lane_out_* 216 transition and the global_out 218 transition represents the skew amount between that lane and the slowest lane. For instance, the implementation in FIG. 2 employs a AND of all the different lane_out_* signals to generate the global_out 218 signal. The difference between the rising edge of a given lane's lane_out_* and the rising transition of global_out 218 represents the skew. There are various different methods by which the de-skew process can be performed. Once all lanes align with the slowest lane, a synchronized word boundary between all the different lanes is assured.

Embodiments may include training sequence requirements as follows. An embodiment may utilize a unique header in the training sequence to initiate the lane_det and lane_out signals for each lane. Additionally, the length for the rest of the training sequence, or training pattern, can be derived by considering two worst case scenarios shown in FIG. 2 and FIG. 3. Consider the fastest lane being the last to assert lane_det. In this case, the fasted lane must bypass all slower lanes and wait for the next header to appear on the same lane to start the deskew process.

Next, consider that the worst case time from lane_det to bypass slowest lane=n clks. In the event the slowest lane is the last to assert lane_det, a length of time is required to extend the fastest lane n clks. Thus, total training sequence length may equal 2n clks plus the header length. Of course, other delays may require additional adjustments to the training sequence length. This may operate as a minimum length for the training pattern to ensure all steps of the deskew protocol can fit in the window of one training sequence.

A deskew protocol, such as illustrated in some embodiments in this disclosure, is necessary for any header based deskew detection algorithm. Multi-lane and point to point systems can benefit from using a training pattern based deskew. Furthermore, the pattern need not be dedicated to deskew and can concurrently initiate different training. A deskew protocol as illustrated herein is simple to implement due to minimal timing critical interfaces between the IO and the core.

Benefits of the illustrated deskew are numerous. For example, board design constraints and manufacturing costs can be reduced dramatically, since lane-to-lane trace matching requirements can be relaxed. A low latency deskew technique can be valuable in coherent memory applications like FBD, DDR etc. Latency may be bounded by a slowest lane, and latency addition to a faster lane can be at a high speed IO clock granularity, thus increasing system performance compared to one where a link layer adds the latency in lower speed core clock cycles. It simplifies link training. Furthermore, serial links that contain multiple lanes and point-to-point links can train more efficiently with a non dedicated training pattern rather than a training pattern dedicated to a deskew operation, because the information coded in the sequence can initiate different events on different lanes based on the current stage the lane is at in the training process. Thus, for characteristic systems with varying delays in different stages of training for the same lane, a more balanced total training time results.

For example, embodiments may comprise a training sequence based deskew method comprising, receiving a repeating training sequence on a plurality of lanes, detecting a header in the training sequence on each of the plurality of lanes, waiting a specified time after detecting a header on each of the plurality of lanes, asserting a deskew enable signal, in response to the deskew enable signal, measuring a timing difference between headers in a subsequent training sequence on each of the plurality of lanes, and deskewing lanes based on the timing difference for each of the plurality of lanes. Additionally, the training sequence may be dedicated to the deskew operation.

An embodiment may also equate the specified time after detecting a header on each of the plurality of lanes to a multiple of the amount of time between the first header detected and the last header detected. In an embodiment, the previously discussed multiple may be two, for example.

An embodiment may comprise waiting a specified time after detecting a header on each of the plurality of lanes, wherein the specified time is determined by a maximum possible skew between lanes. Additionally, an embodiment may include the training sequence repeating until associated training functions are completed. As mentioned above, certain embodiments may involve the header containing information for something other than deskewing.

Figure 4:
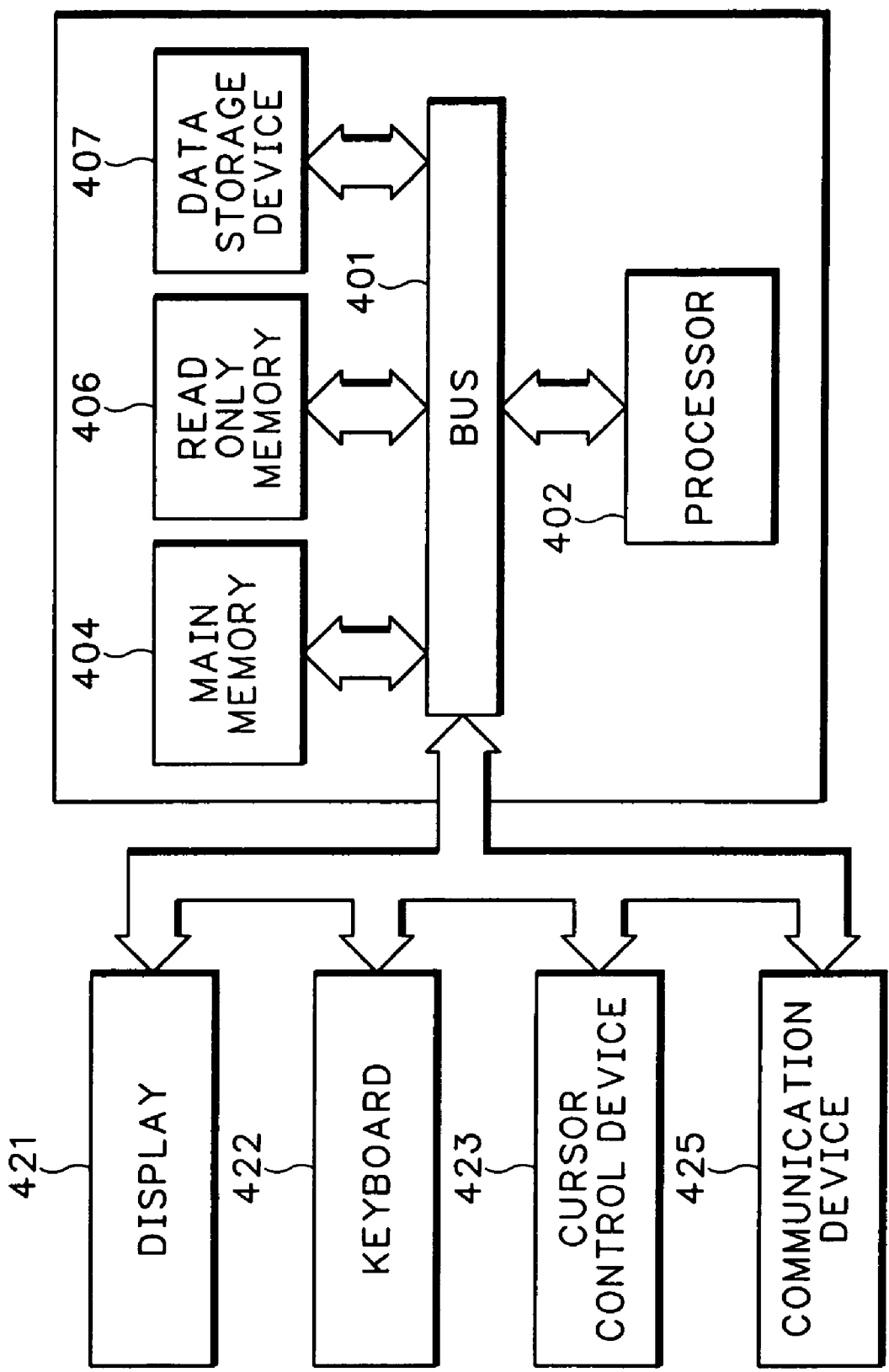
FIG. 4 illustrates an example computing system that may comprise instructions that cause a machine to perform aspects of the invention.

FIG. 4 is a block diagram of an exemplary control system as may be utilized in embodiments of the invention. Embodiments are not limited to a single computing environment. Moreover, the architecture and functionality of embodiments of the invention as taught herein and as would be understood by one skilled in the art is extensible to other types of computing environments and embodiments in keeping with the scope and spirit of the invention. Embodiments provide for various methods, computer-readable mediums containing computer-executable instructions, and apparatus. With this in mind, the embodiments discussed herein should not be taken as limiting the scope of the invention; rather, the invention contemplates all embodiments as may come within the scope of the appended claims.

Embodiments of the invention include various operations, which will be described below. The operations, may be performed by hard-wired hardware, or may be embodied in machine-executable instructions that may be used to cause a general purpose or special purpose processor, or logic circuits programmed with the instructions to perform the operations. Alternatively, the operations may be performed by any combination of hard-wired hardware, and software driven hardware.

Embodiments may be provided as a computer program that may include a machine-readable medium, stored thereon instructions, which may be used to program a computer (or other programmable devices) to perform a series of operations according to inventive principles. The machine-readable medium may include, but is not limited to, floppy diskettes, optical disks, CD-ROM's, DVD's, magno-optical disks, ROM's, RAM's, EPROM's, EEPROM's, hard drives, magnetic or optical cards, flash memory, or any other medium suitable for storing electronic instructions. Moreover, embodiments of the present invention may also be downloaded as a computer software product, wherein the software may be transferred between programmable devices by data signals in a carrier wave or other propagation medium via a communication link (e.g. a modem or a network connection).

FIG. 4 illustrates an exemplary control system 400 upon which embodiments of the invention may be implemented. For example, an apparatus comprising a machine-readable medium may contain instructions that, when executed, cause a machine to receive a repeating training sequence on a plurality of lanes, detect a header in the training sequence on each of the plurality of lanes, wait a specified time after detecting a header on each of the plurality of lanes, assert a deskew enable signal, in response to the deskew enable signal, measure a timing difference between headers in a subsequent training sequence on each of the plurality of lanes, and deskew lanes based on the timing difference for each of the plurality of lanes. Additionally, the training sequence may be dedicated to the deskew operation. Other instructions may cause a machine to perform any of the methods described above in this detailed description.

In the embodiment illustrated in FIG. 4, control system 400 may comprises a bus or other communication means 401 for communicating information, and a processing means such as processor 402 coupled with bus 401 for processing information. Control system 400 further comprises a random access memory (RAM) or other dynamically-generated storage device 404 (referred to as main memory), coupled to bus 401 for storing information and instructions to be executed by processor 402. Main memory 404 also may be used for storing temporary variables or other intermediate information during execution of instructions by processor 402. Control system 400 also comprises a read only memory (ROM) and/ or other static storage device 406 coupled to bus 401 for storing static information and instructions for processor 402.

A data storage device 407 such as a magnetic disk or optical disk and its corresponding drive may also be coupled to control system 400 for storing information and instructions. Control system 400 can also be coupled via bus 401 to a display device 421, such as a cathode ray tube (CRT) or Liquid Crystal Display (LCD), for displaying information to an end user. Typically, an alphanumeric input device (keyboard) 422, including alphanumeric and other keys, may be coupled to bus 401 for communicating information and/or command selections to processor 402. Another type of user input device is cursor control 423, such as a mouse, a trackball, or cursor direction keys for communicating direction information and command selections to processor 402 and for controlling cursor movement on display 421.

A communication device 425 is also coupled to bus 401. The communication device 425 may include a modem, a network interface card, or other well-known interface devices, such as those used for coupling to Ethernet, token ring, or other types of physical attachment for purposes of providing a communication link to support a local or wide area network, for example. In this manner, the control system 400 may be networked with a number of clients, servers, or other information devices.

It is appreciated that a lesser or more equipped computer system than the example described above may be desirable for certain implementations. Therefore, the configuration of control system 400 will vary from implementation to implementation depending upon numerous factors, such as price constraints, performance requirements, technological improvements, and/or other circumstances.

Although a programmed processor, such as processor 402 may perform the operations described herein, in alternative embodiments, the operations may be fully or partially implemented by any programmable or hard coded logic, such as Field Programmable Gate Arrays (FPGAs), TTL logic, or Application Specific Integrated Circuits (ASICs), for example. Additionally, the method of the present invention may be performed by any combination of programmed general-purpose computer components and/or custom hardware components. Therefore, nothing disclosed herein should be construed as limiting the present invention to a particular embodiment wherein the recited operations are performed by a specific combination of hardware components.

FIG. 5 illustrates a memory system 500. The system comprises a host controller 50, at least one memory module such as DIMM 52, an outbound link 54 coupled with each DIMM, and inbound link 56 coupled with a DIMM, wherein the links are coupled with the host controller 50. The host 50 communicates with the DIMMs 52 over the links.

In the embodiment shown in FIG. 5, a host controller 50, may include a link including a plurality of lanes, such as link 54 or link 56, and a circuit coupled with the link, the circuit to generate a signal to send over the plurality of lanes for a remote device to deskew the plurality of lanes. The host controller 50 may generate the signal in response to a plurality of signals received from a remote device. Furthermore, the plurality of signals may be timing signals. Additionally, the timing signals may be in response to a repeating training sequence sent out by the circuit to the remote devices.

In the embodiment shown in FIG. 5, the DIMM 52, or any equivalent module or agent, may include a link comprising a plurality of lanes, wherein the link can receive a repeating training sequence on the plurality of lanes and that training sequence may include a header. The embodiment may also include a circuit coupled with the link, the circuit to wait a specified time after detecting a header on each of the plurality of lanes, measure a timing difference between headers in subsequent training sequences on each of the plurality of lanes, and deskew lanes based on the timing difference for each of the plurality of lanes. The training sequence mentioned above may be dedicated to a deskew operation. Additionally, the training sequence may comprise a unique pattern.

In the embodiment shown in FIG. 5, a system may comprise a link with a plurality of lanes, a host controller coupled with the link, and a remote device coupled with the link. Furthermore, the remote device may deskew signals on the plurality of lanes in response to a global out signal from the host controller, wherein the global out signal is in response to a training sequence. Furthermore, the system may comprise a training sequence that is dedicated to the deskew operation, and the training sequence may further comprise a unique pattern.

FIG. 6 illustrates a system 600 similar to the system shown in FIG. 5, but further comprising a general purpose processor 610 coupled with the host. The general purpose processor 610 may provide some of the circuitry or processing that was in the host controller in FIG. 5, but otherwise the system can provide the same training sequence and deskewing functionality as described in the system in FIG. 5. Likewise, any function performed by a portion of system 500 may be performed by the complementary portion of system 600.

The embodiments described herein may be modified in arrangement and detail without departing from the inventive principles. Accordingly, such changes and modifications are considered to fall within the scope of the following claims.

The invention claimed is:

1. A training sequence based deskew method comprising:
   receiving a repeating training sequence on each of a plurality of lanes;
   detecting a header in the training sequence on each of the plurality of lanes;
   waiting a specified time after detecting a header on each of the plurality of lanes;
   asserting a deskew enable signal;
   in response to the deskew enable signal, measuring a timing difference between headers in a subsequent training sequence on each of the plurality of lanes; and
   deskewing lanes based on the timing difference for each of the plurality of lanes.

2. The method of claim 1 wherein the training sequence is dedicated to the deskew operation.

3. The method of claim 1 wherein the specified time after detecting a header on each of the plurality of lanes is equal to a multiple of an amount of time between the first header detected and a last header detected.

4. The method of claim 3 wherein the multiple is two.

5. The method of claim 1 wherein the specified time after detecting a header on each of the plurality of lanes is determined by a maximum possible skew.

6. The method of claim 1 wherein the training sequence repeats until associated training functions are completed.

7. The method of claim 1 wherein the training sequence contains information for something other than deskewing.

8. The method of claim 1, wherein receiving the repeating training sequence comprises:
   receiving a first series of bits, and
   receiving a second series of bits after receiving the first series of bits, without intervening bits between the first series and the second series, the second series of bits the same as the first series of bits.

9. An apparatus comprising a tangible machine-readable medium containing instructions that, when executed, cause a machine to:
   receive a repeating training sequence on each of a plurality of lanes;
   detect a header in the training sequence on each of the plurality of lanes;
   wait a specified time after detecting a header on each of the plurality of lanes;
   asserting a deskew enable signal after the specified time has elapsed;
   measure a timing difference between headers in a subsequent training sequence on each of the plurality of lanes; and
   deskew lanes based on the timing difference for each of the plurality of lanes.

10. The apparatus of claim 9 wherein the training sequence is dedicated to the deskew operation.

11. The apparatus of claim 9 wherein the specified time after detecting a header on each of the plurality of lanes is equal to a multiple of the an amount of time between a first header detected and a last header detected.

12. The apparatus of claim 11 wherein the multiple is two.

13. The apparatus of claim 9 wherein the specified time after detecting a header on each of the plurality of lanes is determined by a maximum possible skew.

14. The apparatus of claim 9 wherein the training sequence repeats until associated training functions are completed.

15. The apparatus of claim 9 wherein the training sequence contains information for something other than deskewing.

16. An apparatus comprising:
   a link comprising a plurality of lanes, the link to receive a repeating training sequence on each of the plurality of lanes, the training sequence to include a header; and
   a circuit coupled with the link, the circuit to:
      wait a specified time after detecting a header on each of the plurality of lanes and assert a deskew enable signal;
      in response to the deskew enable signal measure a timing difference between headers in a subsequent training sequence on each of the plurality of lanes; and
      deskew lanes based on the timing difference for each of the plurality of lanes.

17. The apparatus of claim 16, wherein the training sequence is dedicated to the deskew operation.

18. The apparatus of claim 16, wherein the training sequence further comprises a unique pattern.

19. A system comprising:
   a link comprising a plurality of lanes;
   a host controller coupled with the link; and
   a remote device coupled with the link, the remote device to:
      wait a specified time after detecting a header on each of the plurality of lanes and assert a deskew enable signal;
      in response to the deskew enable signal, measure a timing difference between headers in subsequent training sequences on each of the plurality of lanes; and
      deskew signals on the plurality of lanes based on the timing difference.

20. The system of claim 19, further comprising a training sequence dedicated to a deskew operation.

21. The system of claim 20, wherein the training sequence comprises a unique pattern.

22. A host controller comprising:
   a link including a plurality of lanes; and
   a circuit coupled with the link, the circuit to generate a signal to send over the plurality of lanes to a remote device, the remote device to deskew the plurality of lanes, the remote device configured to:
      wait a specified time after detecting a header on each of the plurality of lanes and assert a deskew enable signal;
      in response to the deskew enable signal measure a timing difference between headers in a training sequence on each of the plurality of lanes; and
      deskew lanes based on the timing difference for each of the plurality of lanes.

23. The system of claim 22, wherein the signal is in response to a plurality of signals from a remote device, and the plurality of signals are timing signals.

24. The system of claim 23, wherein the timing signals are in response to a repeating training sequence sent out by the circuit.

* * * * *